United States Patent
Chung et al.

(10) Patent No.: US 6,981,746 B2
(45) Date of Patent: Jan. 3, 2006

(54) ROTATING CAR SEAT MECHANISM

(75) Inventors: Tien-Tung Chung, Taipei (TW); Hsiu-Chu Shen, Taipei (TW)

(73) Assignee: Pro-Glory Enterprise Co., Ltd., Taipei (TW)

(*) Notice: Subject to any disclaimer, the term of this patent is extended or adjusted under 35 U.S.C. 154(b) by 0 days.

(21) Appl. No.: 10/867,718

(22) Filed: Jun. 16, 2004

(65) Prior Publication Data

US 2005/0179302 A1     Aug. 18, 2005

(30) Foreign Application Priority Data

Feb. 13, 2004   (TW) ............................... 93202135 U

(51) Int. Cl.
*A47C 1/02*     (2006.01)
(52) U.S. Cl. ............................ 297/344.21; 297/344.23; 297/344.24; 248/425
(58) Field of Classification Search ........... 297/344.21, 297/344.22, 344.24; 296/65.06, 65.07, 65.08; 248/425, 131, 249.1
See application file for complete search history.

(56) References Cited

U.S. PATENT DOCUMENTS

| | | | | |
|---|---|---|---|---|
| 3,013,837 A | * | 12/1961 | Pessl et al. ................. | 296/68.1 |
| 3,964,713 A | * | 6/1976 | Joslyn et al. ................ | 248/418 |
| 4,417,715 A | * | 11/1983 | Edwards ...................... | 248/425 |
| 4,682,813 A | * | 7/1987 | Fohr et al. .............. | 297/188.11 |
| 4,844,543 A | * | 7/1989 | Ochiai .................... | 297/344.26 |
| 4,925,227 A | * | 5/1990 | Bateman ................... | 296/65.05 |
| 5,380,064 A | * | 1/1995 | Yamano et al. ........ | 297/344.22 |
| 5,524,952 A | * | 6/1996 | Czech et al. .............. | 296/65.12 |
| 5,636,884 A | * | 6/1997 | Ladetto et al. ........... | 296/65.13 |
| 5,651,576 A | * | 7/1997 | Wallace .................... | 296/65.11 |
| 5,720,462 A | * | 2/1998 | Brodersen ................... | 248/425 |
| 5,769,480 A | * | 6/1998 | Gebhardt .................. | 296/65.12 |
| 6,027,170 A | * | 2/2000 | Benz et al. ............ | 297/344.21 |
| 6,168,234 B1 | * | 1/2001 | Haynes et al. ......... | 297/344.23 |
| 6,402,114 B1 | * | 6/2002 | Carnahan et al. ........... | 248/425 |
| 6,513,872 B2 | * | 2/2003 | Bar .............................. | 297/232 |
| 6,557,919 B2 | * | 5/2003 | Suga et al. .............. | 296/65.07 |
| 6,572,172 B1 | * | 6/2003 | Ninomiya et al. ....... | 296/65.12 |

* cited by examiner

*Primary Examiner*—Peter R. Brown
*Assistant Examiner*—Erika Garrett
(74) *Attorney, Agent, or Firm*—Bacon & Thomas PLLC

(57) ABSTRACT

A rotating car seat mechanism includes a seat base, a sliding plate, a rotating plate, a guiding socket plate, an axle defining an axis of rotation and a cylindrical pivot rod. The sliding plate is placed inside a car, allowing an upper end of the cylindrical pivot rod to be positioned at the exit of the guiding socket, further enabling the rotation out of the car door and sliding the cylindrical pivot rod into the guiding socket. Due to the path defined by the guiding socket customizing the movement of the cylindrical pivot rod, the rotating plate not only rotates on the axle, but also drives the axle forward. After applying a suitable degree of motion, the rotating plate exceeds out of a narrow space of the car, whereas an opposite amount of motion enables the rotating plate to return to the original point.

2 Claims, 7 Drawing Sheets

(A)          (B)

ROTATING CAR SEAT MECHANISM

BACKGROUND OF THE INVENTION (a) Field of the Invention

The present invention relates to a rotating car seat designed for the handicapped, more particularly, to aid disadvantaged passengers in entering and exiting a vehicle, further provides comfortable seating and reduces the size of a special rotating mechanism.

(b) Description of the Prior Art

The government has cleared many spaces to patronize the elderly and the handicapped, allowing disabled bodies to use a number of public facilities. As a space where a seat is installed in a conventional car is small and there is a gap between the ground and the floorboard of a car, it is difficult for a disabled body to board a car, therefore there is a need for installation of equipment that may assist handicapped passengers to enter and exit a vehicle.

Referring to a Taiwanese patent, publication number 338022, titled A Conventional Rotating Car Seat relates to a type of rotating mechanism of a car seat, wherein a bottom side of a car seat has a rotating base seat assembled; a securing base seat is assembled on a base seat to support the rotating base plate. A ring shaped sliding track number 1 is assembled onto the rotating base seat, whereas a corresponding ring shaped sliding track number 2 assembled to secure the base seat. A protective resin loop is formed in between track number 1 and track number 2 interlinking them together. A track number 1 and track number 2 of a bottom seat is meshed together, allowing the bottom seat to rotate via a center point of the protective resin loop.

Referring to a French patent, application number 2776583, titled A Vehicle Seat with Base Pivoting on Vehicle Chair, which relates to rotating mechanism in a car seat, wherein a rotating unit is secured to a floorboard of a car and a car seat installed onto the rotating unit thereafter, allowing rotation from a set point in a car to exceed outside a car door.

The two aforesaid car seat rotating structure needs a large space for installation, and is more difficult to be installed into a narrow space of a small car.

Referring to a Japanese patent, registration number 2002-337577, titled A Car Seat Elevation Device, which relates to a new car seat rotating mechanism design, wherein a special incline-shaped sliding socket is assembled to a floorboard of a car and a moving rotator is assembled to a base plate of a car seat, whereby inserting the moving rotator into the incline-shaped guiding socket thereafter. The rotator rotates and declines down the incline-shaped guiding socket simultaneously, allowing movement to a designated position on the ground surface outside the vehicle. Although the space that is needed by the aforesaid mechanism is smaller, a stronger structure is needed, therefore more costly, and more complex to install.

Referring to a Japanese utility model, registration number 2002-065748, titled A Wheelchair Carrier Device for Car Use, which relates to a new car seat rotating mechanism, consisting of a rotating plate, a sliding plate, a linking arm, two turning rods, an eccentric axis and a sliding track etc. The rotating plate is assembled on an upper side of the sliding plate with the eccentric axis assembled in between. The sliding board is assembled to a floorboard of a car and is linked together by the sliding track, whereas to ends of the linking arm connects to the axis on the floorboard of a car, and the axis at an edge of the rotating plate respectively, in addition, the car seat is secured on an upper side of the rotating plate. As the rotating plate rotates out of the car door, also allows the sliding plate to slide forward, thus reduces the rotating space of the car seat.

Referring to a Japanese utility model, registration number 2003-127726, titled A Rotating Seat for Car Use, which relates to a new car seat rotating mechanism, comprising a rotating plate, a sliding plate, a connecting arm, a connecting rod, a centric axis, two thrust bearings and two rotating axis etc. The mechanism is much like that of the aforesaid Japanese utility model number 2002-065748, as the rotating plate rotates out of the car door, also allows the sliding plate to slide forward, thus reduces the rotating space of the car seat.

The aforesaid two Japanese utility mode, registration number 2002-065748 and 2003-127726 both use similar linking rods, allowing the movement of the sliding plate as a car seat rotates, thereby enabling the rotating plate to rotate out of the car door. The space needed is smaller than that of a secured-type rotating axis, and because the length of the linking rods are fixed, therefore the rotation of the car seat becomes fixed correspondingly and different space limitations of various cars, which results in reduced flexibility of the mechanism.

In conclusion, the aforementioned various patent designs, the rotating car seat of the secured-type rotating axis need larger spaces for installation, not suitable for installing in narrow spaces of the front seat of a small vehicles. The improved mechanism with the application of linking rods, which enables smaller installation spaces and suited for installation in the front seat of a car. Yet, the mechanism is more complex and the rotating car seat lacks flexibility.

SUMMARY OF THE INVENTION

A primary objective of the present invention is to provide a simple, stable, easy control, smaller space needed and a more concise seat movement out of a car door. Comprising of a sliding plate, a rotating plate, axle defining an axis of rotation, a cylindrical pivot rod secured to a base frame and a guiding socket plate assembled to the rotating plate. The pivoting rod is inserted into a guiding socket on the guiding socket board, allowing the seat to safely and securely exceed the car door by firstly rotating to a specific angle and simultaneously rotating and sliding forward thereafter. The rotating car seat mechanism is installed to an upper side of the sliding plate and inherits the flat forward and backward movement of a conventional car set.

To enable a further understanding of the said objectives and the technological methods of the invention herein, the brief description of the drawings below is followed by the detailed description of the preferred embodiments.

BREIF DESCRIPTION OF THE DRAWINGS

FIGS. 8A–D shows a planar view of a structural movement according to the present invention.

FIGS. 9A–D shows a perspective schematic view of an operational movement according to the present invention.

Figure 10:
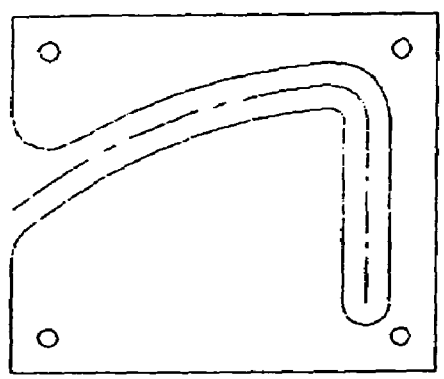
Figure 10:
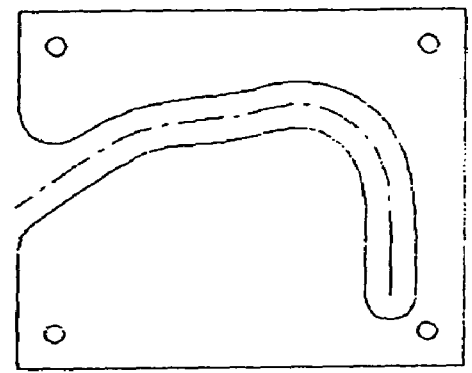

FIGS. 10A, B shows a planar view of two different guiding socket plates according to the present invention.

DETAILED DESCRIPTION OF THE PREFFERED EMBODIMENT

To better understand the present invention, detailed descriptions shall be given with the accompany drawings hereunder.

Figure 1:
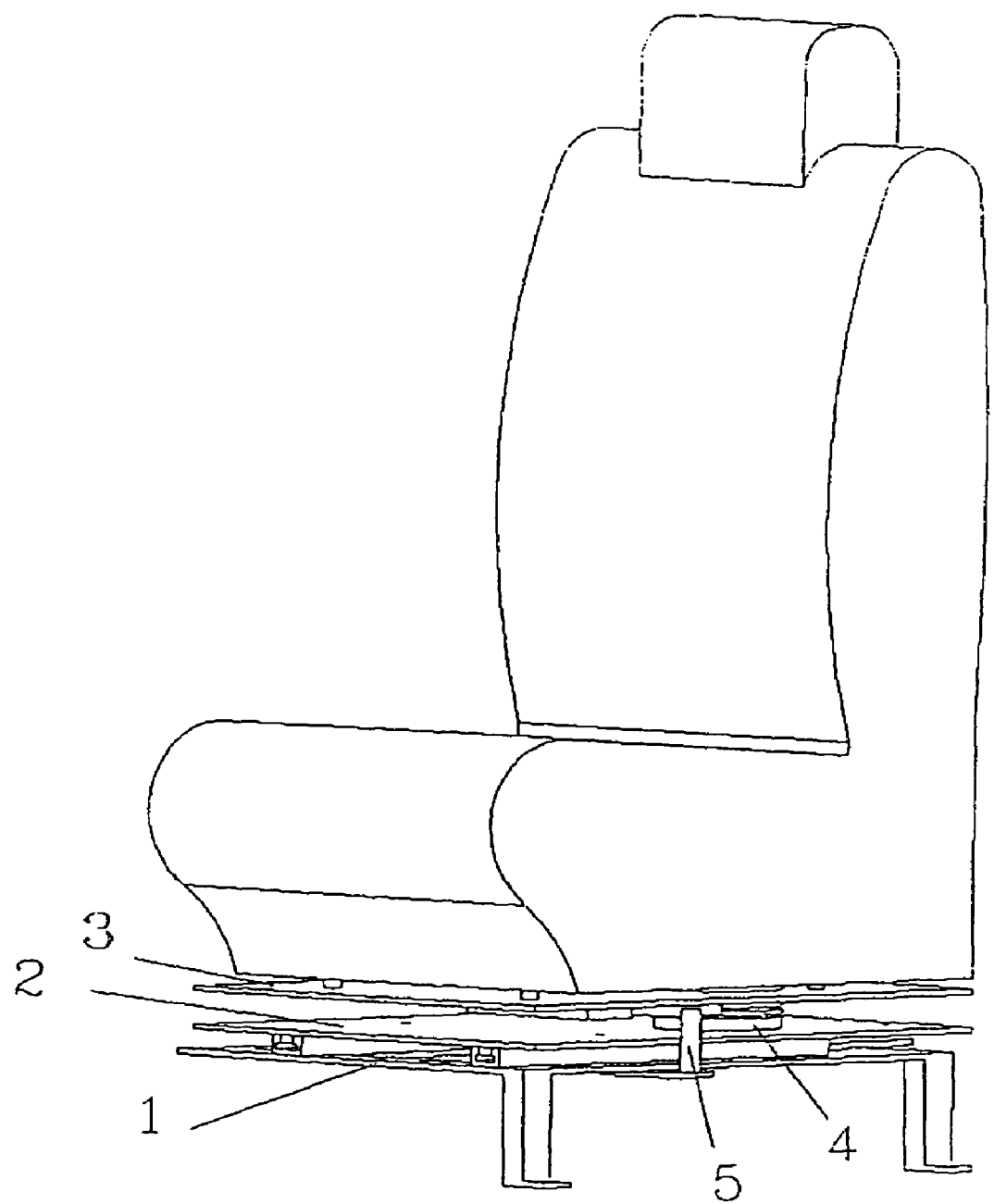
FIG. 1 shows a perspective schematic view in assembled state according to the present invention.
Figure 2:
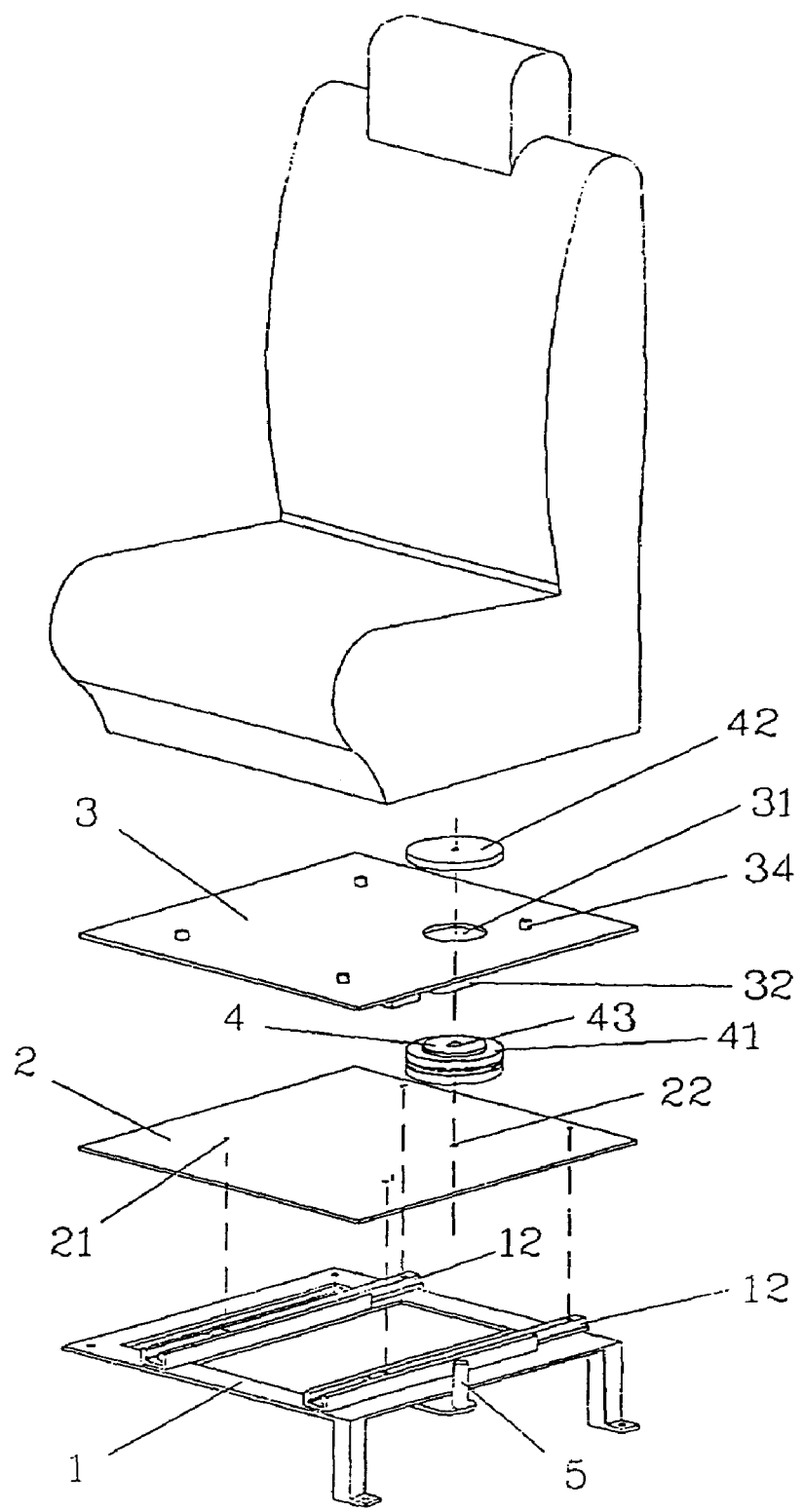
FIG. 2 shows an exploded view according to the present invention.

As shown in FIG. 1 a rotating car seat mainly comprises of a seat base 1, a sliding plate 2, a rotating plate 3, an axle 4 and a cylindrical pivoting rod 5, whereas FIG. 2 shows the assembly of the respective components thereafter.

Figure 3:
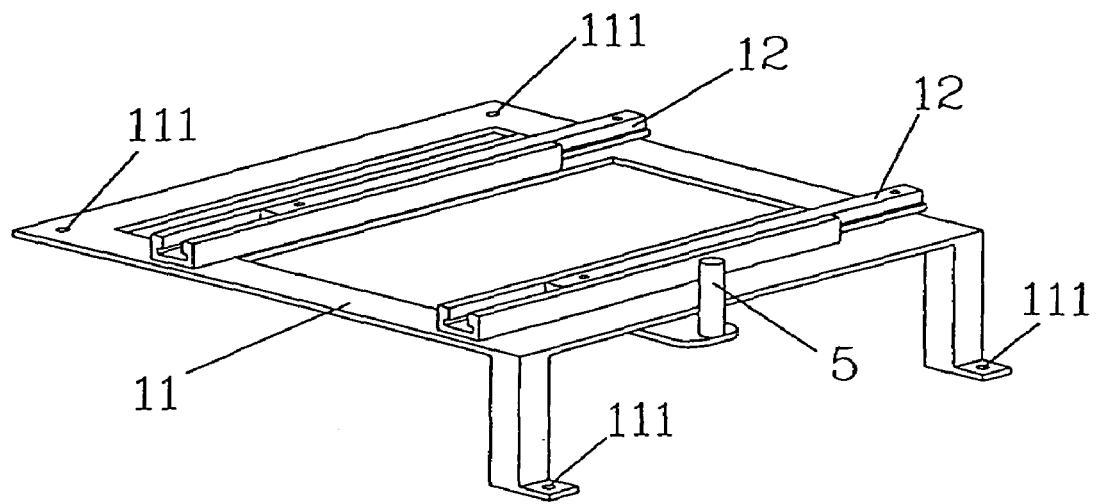
FIG. 3 shows a perspective schematic view of a base seat in assembled state according to the present invention.

As shown in FIG. 3, the seat base comprises a base frame 11 and a sliding track 12, wherein four securing apertures 111 are formed on the base frame 11, thereby securing the base frame 11 to a floor board of a car by means of screws.

Figure 4:
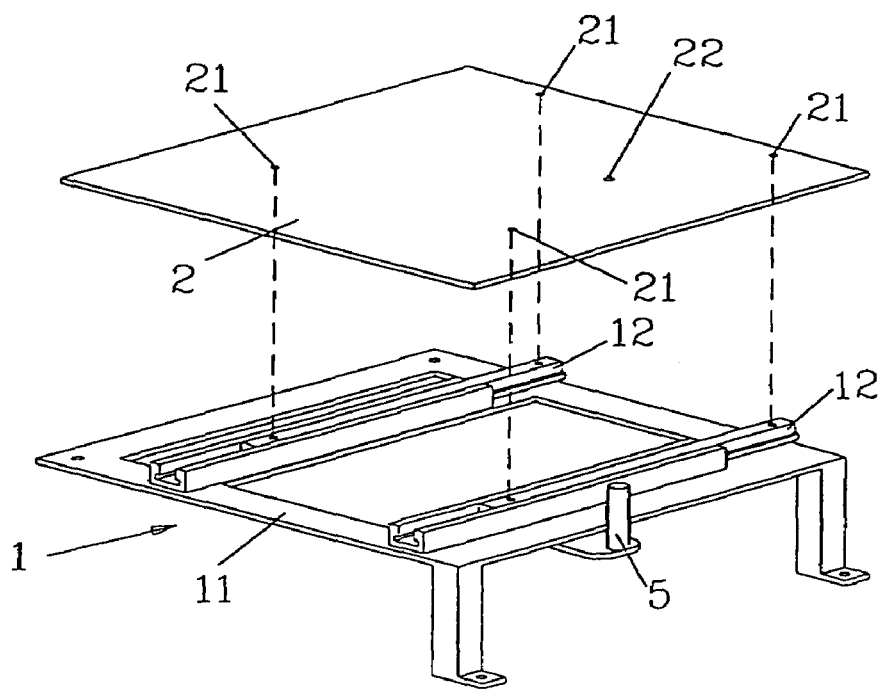
FIG. 4 shows an exploded view of a sliding plate according to the present invention.

As shown in FIG. 4, four sliding track securing apertures 21 and an axle securing aperture 22 is formed on the sliding plate 2, thereby securing the sliding plate 2 to the sliding track 12 of the seat base 1 by means of screws.

Figure 5:
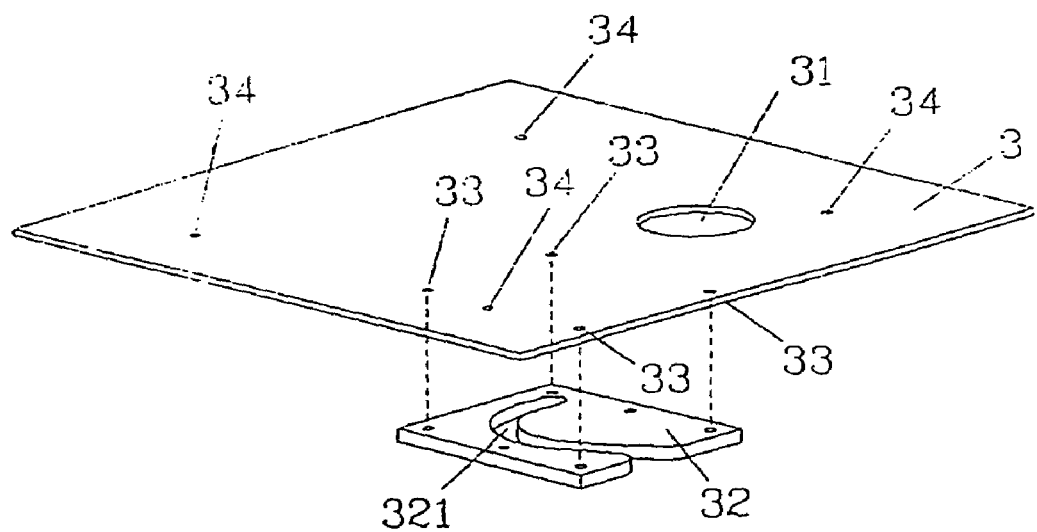
FIG. 5 shows an exploded view of a rotating plate according to the present invention.

As shown in FIG. 5, a plurality of guiding socket plate securing apertures 33, four seat securing apertures 34 and an axle inserting hole 31 are formed on the rotating plate 3. An upper side of the rotating plate 3 can be secured to a conventional car seat or to a wheelchair for the handicapped by means of the seat securing apertures 34. A guiding socket plate 32 is secured to a bottom side of the rotating plate 3 by means of the guiding socket plate securing apertures 33, wherein a special shaped guiding socket 321 is formed thereon.

Figure 6:
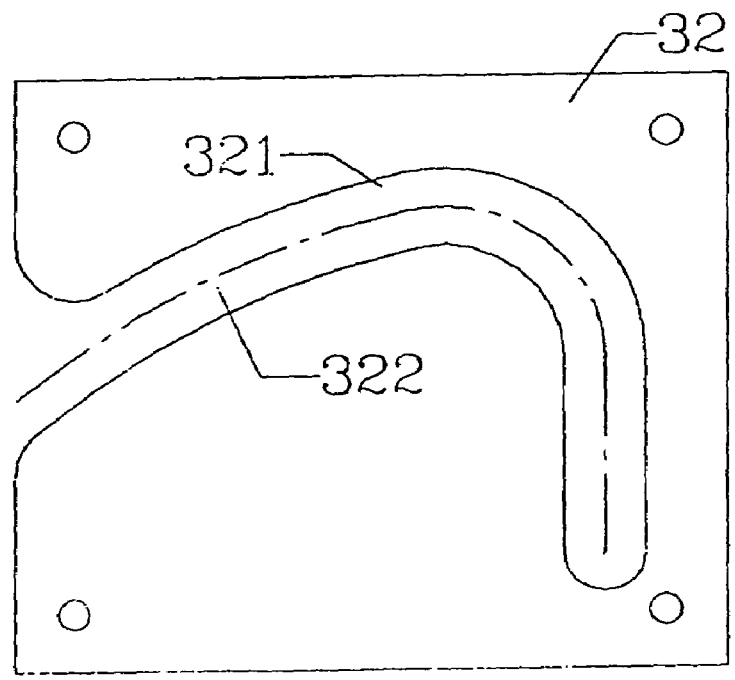
FIG. 6 shows a planar view of a guiding socket plate according to the present invention.

As shown in FIG. 6, the guiding socket 321 defines a path, illustrated by imaginary line 327, having a segment with a large radius, smaller radius and a straight line.

Figure 7:
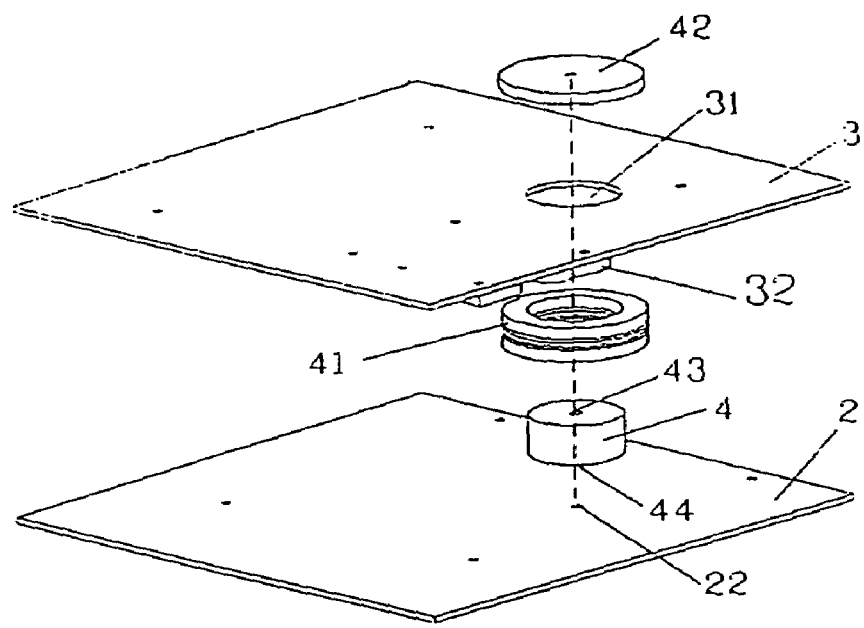
FIG. 7 shows an exploded view of an axle according to the present invention.

As shown in FIG. 7, screw apertures 43 and 44 are formed on an upper and a lower side of the axle 4 wherein the lower side screw aperture 44 of the axle 4 is secured to an upper side of the sliding plate 2, tightly screwing the lower side screw aperture 44 with the axle securing aperture 22 near a rear end of the sliding plate 2 and close to a door thereafter. Additionally, an outer circumference of the axle 4 fits together with thrust bearing 41 therein and an axle cover 42 is configured on the upper side of the axle 4. When assembling, an axle insertion hole 31 of the rotating plate 3 is set onto an upper side of the outer circumference of the axle 4, thereby enabling the rotating plate 3 to hold firmly against the non-frictional bearing 41. Thereafter, the axle cover 42 is secured to an upper side screw aperture 43 of the axle, thus allowing the rotating plate 3 to rotate on the axle 4 about the axis of rotation on the upper side of the sliding plate 2, further, when the sliding plate 2 moves forward and backward on the sliding track 12, the rotating plate 3 moves correspondingly by means of the axle 4;

As shown in FIGS. 3 and 6, a bottom end of the cylindrical pivot rod 5 is secured to an appropriate position on the base frame 11, or secured to directly below on the car floorboard, and an outer circumference of the cylindrical pivot rod 5 can be inserted firmly to the guiding socket 321 of the guiding socket plate 32 thereafter.

Figure 8:
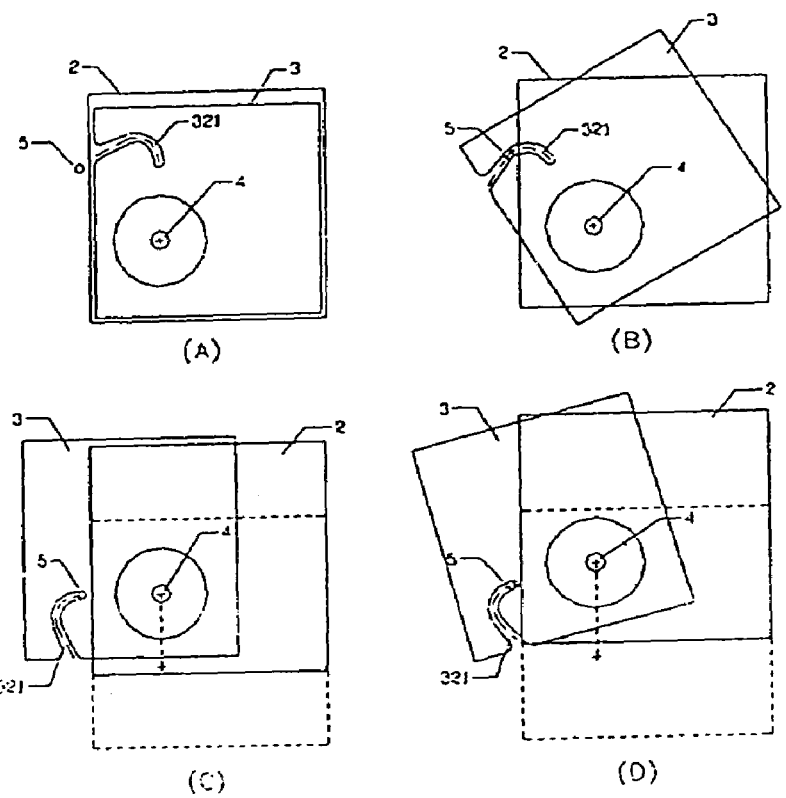
Figure 9:
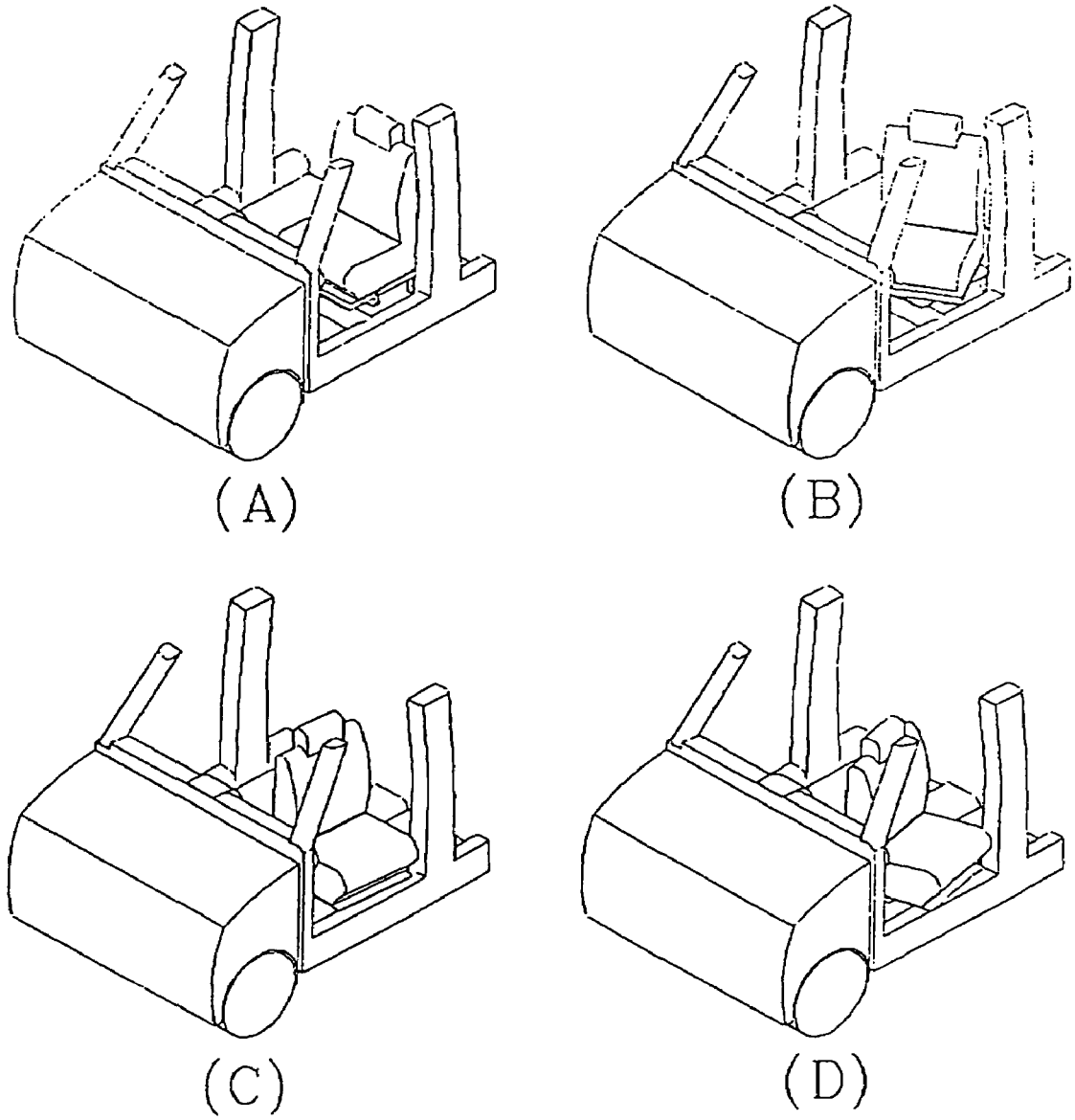

In the aforesaid structure, the sliding plate 2 is moved to an appropriate position inside the car when in operation, as shown in FIGS. 8A and 9A, allowing an upper end of the cylindrical pivot rod 5 to be positioned at an exit of the guiding socket 321. When the rotating plate 3 is rotated towards the car door, the cylindrical pivot rod 5 slides into the guiding socket 321 simultaneously, as shown in FIGS. 8B and 9B. Thereafter, the rotating plate 3 is continually pushed until extended out of the car door, and because the movement of the guiding socket 321 is driven by the fixed cylindrical pivot rod 5, the rotating plate 3 not only rotates on the axle 4, but the axle 4 also drives the rotating plate 3 forward, thereby enabling the sliding plate 2 and the axle 4 to slide forward, as shown in FIGS. 8C, D and FIGS. 9C, D. The aforesaid configuration allows a suitable degree of motion of the rotating plate 3 to exceed out of a narrow space of the car, whereas, reversing the operation enables the rotating plate 3 to return to the original position (following the sequence of FIGS. 8 and 9 D,C,B,A respectively).

Whilst the car is in motion, the rotation plate 3 is secured to the sliding plate 2 with a securing mechanism, to indemnify the safety of handicapped passengers, additionally, as shown in FIGS. 8A and 9A, there is no contact with the corresponding guiding socket 321 on the guiding socket plate 32 and the cylindrical pivot rod 5, thus the forward and backward movement of the sliding plate 2 drives the axle 4 and the rotating plate 3 forward and backward simultaneously, achieving the parallel forward and backward movement of a conventional car set.

In addition, the rotating car seat mechanism applied to handicapped, wherein a path of the guiding socket 321, illustrated by imaginary line 322, corresponds to an embodiment of a type of car, thus with different types of cars and different designs, the path of guiding socket 321 as illustrated is designed suitably by assembling curves and straight lines together, two different types of the embodiments as shown in FIGS. 10A and B, such as seat position, space limit of a car seat, shape of car door, the exceeding position of the rotating plate 3 outside a care door etc.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A rotating car seat mechanism, comprising:
   a seat base, having a base frame and a sliding track, wherein the base frame secured to a floorboard of a car therein;
   a sliding plate, securing to an upper side of the sliding track on the seat base, wherein the sliding plate is movable forward and backward along the sliding track;
   a rotating plate, having an axle inserting hole, wherein a top surface of the rotating plate is adapted for securing a conventional car seat or a wheelchair; the rotating plate further having a guiding socket plate formed on a lower side thereof, wherein a guiding socket with designated shape formed thereon defines a path having a segment with a large radius, a segment with a smaller radius and a segment extending along a straight line;
   an axle defining an axis of rotation, disposed near a rear end of the sliding plate and close to a car door; a thrust bearing associated with the axle, and an axle cover configured on the upper side of the axle; wherein the axle insertion hole of the rotating plate is set onto an upper side of the outer circumference of the axle, thereby enabling the rotating plate to hold firmly against the thrust bearing; the axle cover is secured to an upper side screw aperture of the axle, thus allowing the rotating plate to rotate on the axle about said axis of rotation on the upper side of the sliding plate; when the sliding plate moves forward and backward on the sliding track, the rotating plate moves correspondingly by means of the axle;

a cylindrical pivot rod, having an outer circumference fitted into the guiding socket of the guiding socket plate; wherein a bottom end of the cylindrical pivot rod is assembled to the base frame or secured to directly below on the car floorboard;

wherein the sliding plate is moved to an appropriate position inside the car when in operation, allowing an upper end of the cylindrical pivot rod to be positioned at an exit of the guiding socket thereon; when the rotating plate is rotated towards the car door, the cylindrical pivot rod slides into the guiding socket simultaneously; the rotating plate is continually pushed until extended out of the car door, and because the movement of the guiding socket is driven by the fixed cylindrical pivot rod, the rotating plate not only rotates on the axle, but the axle also drives the rotating plate forward, thereby enabling the sliding plate and the axle to slide forward; this configuration allows a suitable degree of motion of the rotating plate to exceed out of a narrow space of the car, whereas reversing the operation enables the rotating plate to return to the original position.

2. The rotating car seat mechanism as recited in claim 1, wherein the path of the guiding socket is designed suitably by assembling curves and straight lines together according to parameters, including seat position, space limit of a car seat, shape of car door, the exceeding position of the rotating plate outside a car door, of a car.

* * * * *